US009183771B2

(12) United States Patent
Majumder et al.

(10) Patent No.: US 9,183,771 B2
(45) Date of Patent: Nov. 10, 2015

(54) PROJECTOR WITH ENHANCED RESOLUTION VIA OPTICAL PIXEL SHARING

(75) Inventors: Aditi Majumder, Irvine, CA (US); Behzad Sajadi, Irvine, CA (US); Gopi Meenakshisundaram, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 351 days.

(21) Appl. No.: 13/566,089

(22) Filed: Aug. 3, 2012

(65) Prior Publication Data
US 2014/0035919 A1 Feb. 6, 2014

(51) Int. Cl.
G09G 5/10 (2006.01)
G06T 17/00 (2006.01)
G09G 3/00 (2006.01)
G03B 21/00 (2006.01)
H04N 9/31 (2006.01)

(52) U.S. Cl.
CPC .............. *G09G 3/002* (2013.01); *G03B 21/006* (2013.01); *G09G 3/007* (2013.01); *H04N 9/3188* (2013.01); *G09G 2300/023* (2013.01); *G09G 2340/0407* (2013.01)

(58) Field of Classification Search
CPC ............ G09G 2340/0407; G09G 5/10; G03H 2225/60; G03H 2240/61; G03H 1/265; G03H 2001/2655; G03H 2210/22; G03H 2240/42; H04N 9/3197; H04N 9/3126; H04N 9/3188; H04N 5/7416; H04N 9/31; H04N 13/0438; H04N 13/0459; H04N 5/2256
USPC ..................... 345/428, 690; 353/81
See application file for complete search history.

(56) References Cited

U.S. PATENT DOCUMENTS

2009/0201498 A1* 8/2009 Raskar et al. ................. 356/310
2012/0274674 A1* 11/2012 Whitehead et al. ........... 345/690
2014/0043460 A1* 2/2014 Hartell et al. ................... 348/79

OTHER PUBLICATIONS

Fattal, Image Upsampling via Imposed Edge Statistics, Jul. 2007, ACM Transaction on Graphics, vol. 26, No. 3, Article 95, p. 1-8.*
Agrawal et al., Resolving Objects at Higher Resolution from a Single Motion-blurred Image, IEEE CVPR, 2007.
Aliaga et al., Fast high-resolution appearance editing using superimposed projections. ACM TOG, 2011.
Allen et al., Wobulation: Doubling the addressed resolution of projection displays. Symposium of Information Display, 2005.
Babu et al., A survey on the methods of super-resolution image reconstruction. IJCV, 15(2), 2011.
Baker et al., A theory of single-viewpoint catadioptric image formation. IJCV, 35(2), 1999.
Bhasker et al., Registration techniques for using imperfect and partially calibrated devices in planar multi-projector displays. IEEE TVCG, 13(6), 2007.

(Continued)

*Primary Examiner* — Kee M Tung
*Assistant Examiner* — Yuehan Wang
(74) *Attorney, Agent, or Firm* — Shimokaji IP

(57) ABSTRACT

A projector configured to provide higher resolution output without increasing pixel resolution in a light modulator is disclosed. The projector may introduce an optical element between a light modulator and an imaging lens. The optical element may provide pixel sharing of a target image. The pixel sharing may be produced by, for example, making smaller copies of pixels. Selected copies of pixels may be passed to the imaging lens to display an output image with selected areas of higher density pixels.

19 Claims, 10 Drawing Sheets

(56) References Cited

OTHER PUBLICATIONS

Chen et al., Scalable alignment of large-format multiprojector displays using camera homography trees. IEEE Vis, 2002.
Cole et al., Two fast methods for high-quality line visibility. IEEE TVCG, 16(5), 2010.
Cole et al., How well do line drawings depict shape? ACM TOG, 28(3), 2009.
Tomasi et al., Bilateral filtering for gray and color images. ICCV, 1998.
Damera-Venkata et al., Display supersampling. ACM TOG, 28(1), 2009.
Debevec et al., Recovering high dynamic range radiance maps from photographs. ACM Siggraph, 1997.
DeCarlo et al., Interactive rendering of suggestive contours with temporal coherence. NPAR, 2004.
Dijk et al., A new sharpness measure based on gaussian lines and edges. CAIP, 2003.
Durand et al., Fast bilateral filtering for the display of high-dynamic-range images. ACM TOG, 21(3), 2002.
R. Fattal, Image upsampling via imposed edges statistics. ACM TOG, 26(3), 2007.
Hirsch et al., BiDi screen: A thin, depth sensing LCD for 3D interaction using lights fields. ACM TOG, 28(5), 2009.
Jaynes et al., Super-resolution composition in multi-projector displays. PROCAMS, 2003.
Kopf et al., Joint bilateral upsampling. ACM TOG, 2007.
Kuthirummal et al., Multiview radial catadioptric imaging for scene capture. ACM TOG, 2006.
Wetzstein et al., Polarization fields: Dynamic light field display using multi-layer LCDs. ACM TOG, 30(6), 2011.
Lanman et al., Content-adaptive parallax barriers: optimizing dual-layer 3d displays using low-rank light field factorization. ACM TOG, 2010.
Lazarev et al., Materials for light efficient LCD. Society for Information Display (SID), 2009.
Levin et al., Image and depth from a conventional camera with a coded aperture. ACM TOG, 26(3), 2007.
Levin et al., Motion-invariant photography. ACM TOG, 27(3), 2008.
Liang et al., Programmable aperture photography: multiplexed light field acquisition. ACM TOG, 27(3), 2008.
Majumder et al., Display gamut reshaping for color emulation and balancing. IEEE CVPR Workshop on Projector Camera Systems (PROCAMS), 2010.
Majumder et al., Is spatial super-resolution possible with multiple overlapping projectors? ICASSP, 2005.
Majumder et al., Perception based contrast enhancement of images. ACM Transactions on Applied Perception, 4(3), 2007.
Majumder et al., Perceptual photometric seamlessness in tiled projection-based displays. ACM TOG, 24(1), 2005.
Nayar et al., Fast separation of direct and global components of a scene using high frequency illumination. ACM TOG, 25, 2006.
Raskar et al., Coded exposure photography: Motion deblurring using fluttered shutter. ACM TOG, 25(3), 2006.
Raskar et al., Non-photorealistic camera: Depth edge detection and stylized rendering using multi-flash imaging. ACM TOG, 23(3), 2004.
Raskar et al., Image precision silhouette edges. ACM I3D, 1999.
Veeraraghavan et al., Dappled photography: Mask enhanced cameras for heterodyned light fields and coded aperture refocusing. ACM TOG, 26(3), 2007.
Veeraraghavan et al., Coded strobing photography: Compressive sensing of high-speed periodic events. IEEE PAMI, 2010.
Wakin et al., An architecture for compressive imaging. ICIP, 2006.
Wetzstein et al., Layered 3D: Tomographic image synthesis for attenuation-based light field and high dynamic range displays. ACM TOG, 30(4), 2011.
Wilburn et al., High performance imaging using large camera arrays. ACM TOG, 24(3), 2005.
Winkler et al., Visual fidelity and perceived quality: towards comprehensive metrics. Proceedings of SPIE, 4299, 2001.

* cited by examiner

PROJECTOR WITH ENHANCED RESOLUTION VIA OPTICAL PIXEL SHARING

STATEMENT OF GOVERNMENT INTEREST

The invention described herein was made in the performance of official duties by one or more employees of the University of California University system, and the invention herein may be manufactured, practiced, used, and/or licensed by or for the government of the State of California without the payment of any royalties thereon or therefor.

This invention was made with Government support under Grant No. IIS0846144, awarded by the National Science Foundation. The Government has certain rights in this invention.

BACKGROUND

The present invention relates to image projectors and more specifically, to a projector with enhanced resolution via optical pixel sharing.

The recent years have seen a development in projector image quality, in terms of brightness, contrast and resolution. In some projectors, an image is projected by a light source stimulating a light modulator or sensor whose output is projected through an imaging lens. The output image is typically of lower resolution than the source image. The resolution of the output image is generally a factor dependent on the pixel size of a modulator reproducing the image. Greater resolution from one projector to the next is known to be accomplished by decreasing the pixel size within the sole modulator to provide higher pixel density. Higher pixel density decreases the amount of light "information" lost between the image source and the projected image. However, the relationship of cost with respect to decreasing pixel size in a modulator to provide improved resolution from that modulator may be linear. For example, the cost of a four Megapixel projector may be ten times that of a two Megapixel projector while resolution just doubles.

Accordingly there is a need for a projector system that provides a cost effective approach to increased resolution.

SUMMARY

According to one aspect of the present invention, a projector comprises a light source; a first light modulator in an optical path with the light source; an imaging lens in the optical path with the light source and the first light modulator; an optical element disposed in the optical path between the first light modulator and the imaging lens; and a controller coupled to the first light modulator, wherein the controller is configured to control light output from the first light modulator.

According to another aspect of the invention, a projector comprises a light source; a first light modulator in an optical path with the light source; an imaging lens in the optical path with the light source and the first light modulator; a second light modulator disposed between the first light modulator and the imaging lens; an optical element disposed in the optical path between the first light modulator and the second light modulator; and a controller coupled to the first light modulator, wherein the controller is configured to display a projected image, of a target image, produced by alternating between a first light output from the first light modulator and a second light output from the second light modulator, wherein the projected image includes regions of spatially varying pixel density.

According to another aspect of the invention, a method of producing an image comprises controlling a first and second light modulator to create a first light output at a lower resolution; controlling the first and second light modulator to create a second light output with higher resolution than the lower resolution at selected spatial regions; and temporally multiplexing the first and second light outputs to produce an output image with spatially varying pixel density where selected regions of the output image are at a higher pixel resolution than other regions of the output image.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the subject technology may provide an apparatus that increases image resolution in selected regions of the image. In some embodiments, an optical element may be introduced in between a light modulator and an imaging lens. In further embodiments, the apparatus may be configured to control data processed through the introduced optical element to manipulate pixel density on an output image. Still yet, further embodiments may describe exemplary methods of increasing pixel density output without using smaller pixels in the light modulator.

Figure 1:
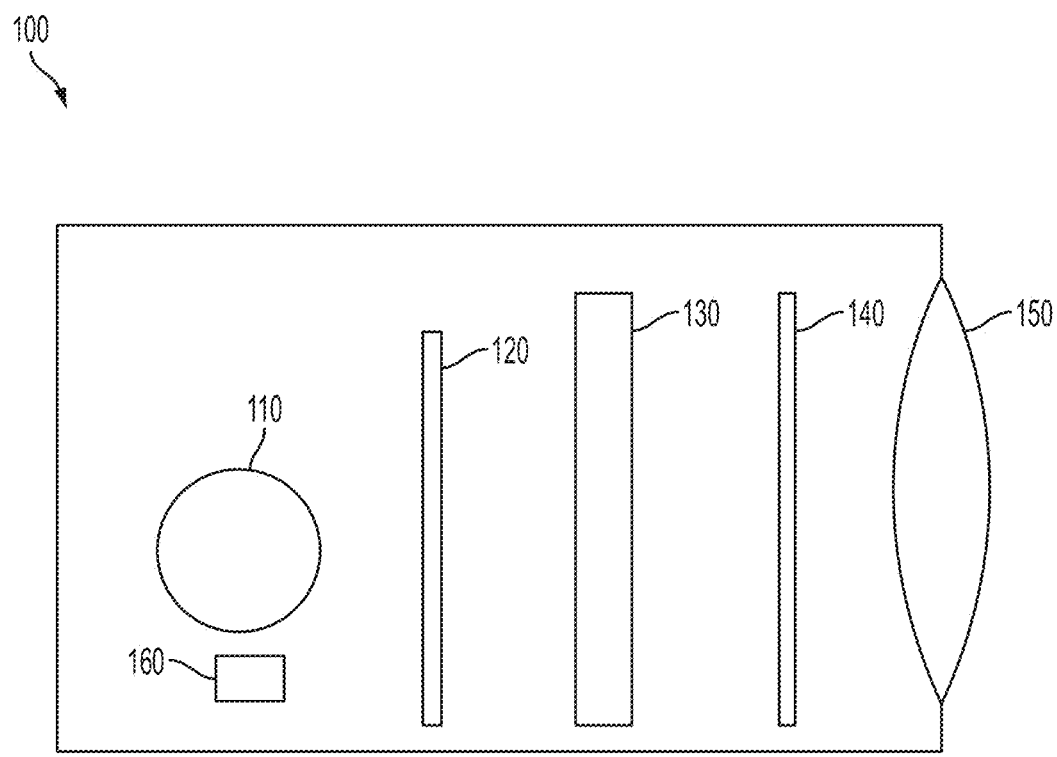
FIG. 1 is a side view of a block diagram of a projector in accordance with an exemplary embodiment of the present invention.

Referring now to FIG. 1, a projector 100 is shown according to an exemplary embodiment of the present invention. The projector 100 may include a light source 110, a light modulator 120, an optical element 130, another light modulator 140, a projection or imaging lens 150, and a controller 160. For sake of illustration, electrical connections between the controller 160, the light source 110, and light modulators 120 and 140 are not shown. The optical element 130 may be wholly optical or in some embodiments may be electro-optical, in which case it may also be connected to the controller 160. While the optics of the projector 100 are shown in a linear configuration, it will be understood that they may be arranged non-linearly as long as an optical path producing a reproduction of a target image projected through the imaging lens 150 is achieved. For example, the projector 100 may be arranged so that the light modulator 120 may be in an optical path with the light source 110. The imaging lens 150 may be in the optical path with the light source 110 and the light modulator 120. The light modulator 140 may be disposed between the light modulator 120 and the imaging lens 150. The optical element 130 may be disposed in the optical path between the light modulator 120 and the light modulator 140. The light modulators 120 and 140 may be, for example, liquid crystal display (LCD) or digital micromirror device (DMD) types. The optical element 130 may be, for example, a set of lenses arranged to reproduce pixel images from the first light modulator into smaller copies. In an exemplary embodiment, four cascaded lenses may be employed.

According to exemplary embodiments of the subject technology, two relatively lower resolution light modulator panels, for example, light modulators 120 and 140, of resolution n×n (assuming square pixel panels without loss of generality) may be arranged to so that the projector 100 may display images that provide a close perceptual match to a higher resolution display of resolution cn×cn where c is a small integer greater than 1. Some embodiments may provide spatially variable pixel density across an image by realizing higher pixel density at predetermined or preselected areas of the image. Thus, the resultant image may provide improved resolution in regions of the image that may benefit from greater detail while other regions where increased detail may be of less importance, may be left with a lower resolution. For example, since edges may be considered to be perceptually important, enhanced resolution of a target image may be performed by creating an edge-enhanced image. Edges may include, for example, the edges of image features.

Figure 2:
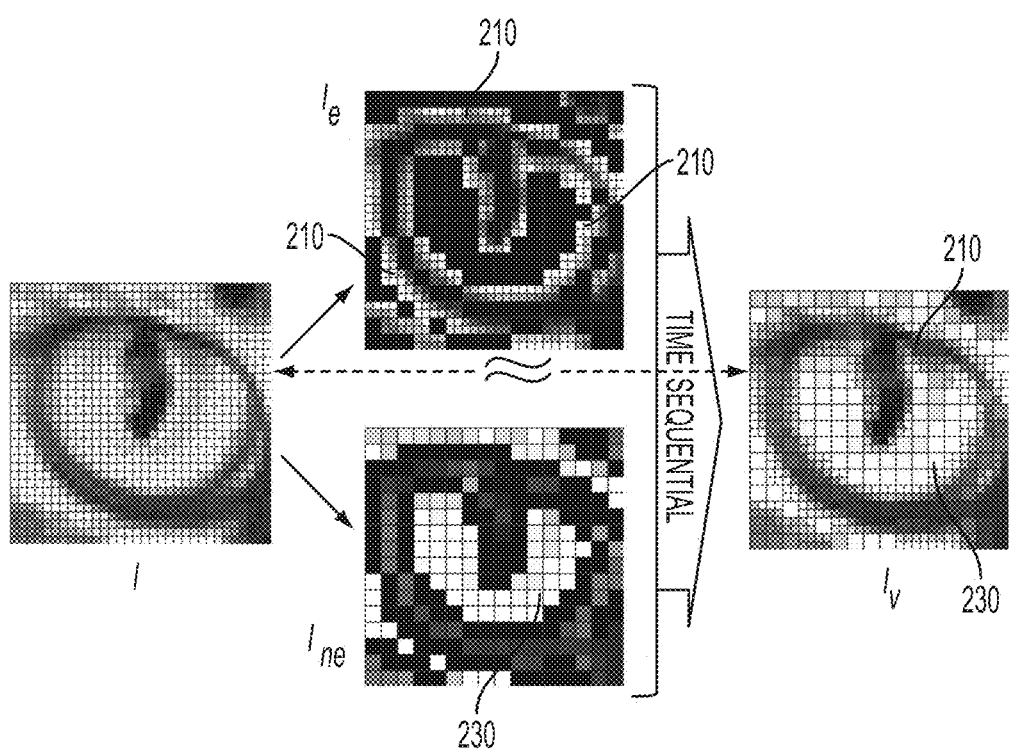
FIG. 2 is a series of images showing a target image deconstructed into a higher resolution edge image and a lower resolution edge image which are temporally multiplexed by the controller of the projector of FIG. 1 to produce a resultant image employing regions of edge enhancement.

Referring now to FIG. 2, an exemplary processing of a target image I is shown according to an exemplary embodiment of the present invention. A display with higher resolution targeted only at pixels where high frequency content is concentrated may be sufficient to create an image $I_v$ that is perceptually almost identical to one produced by a true higher resolution display. Higher frequency content in an image is given by a small set of pixels at, for example, edges. To produce the image $I_v$ the target image I may be decomposed into two images; $I_e$ and $I_{ne}$. $I_e$ may represent a set of pixels 210 creating a higher resolution (cn×cn) image. The rest of the image, which may be complementary to the image $I_e$, may be an image $I_{ne}$ and may be reproduced at the lower resolution (n×n) of unmodified pixels 230. In an exemplary embodiment, the pixels 210 of image $I_e$ may comprise edge feature pixels while the pixels 230 of image $I_{ne}$ may comprise non-edge feature pixels. As will be described in further detail, the edge pixels 210 may be of higher pixel density (smaller pixel size) than the non-edge pixels 230 (lower density; bigger pixel size). The selected edge pixels 210 may be displayed at a higher resolution using $c^2$ pixels whose size is $c^2$ times smaller than an unmodified pixel 230. More importantly, these smaller pixels may be created using spatial light modulators (120; 140) that may project an unmodified pixel that is $c^2$ times larger that the desired higher resolution pixel size. In an exemplary embodiment, the images $I_e$ and $I_{ne}$ may be projected in a time sequential manner alternating between each image to create the edge-enhanced image $I_v$ that may be a combination of the higher resolution pixels 210 with the lower resolution pixels 230. With current 3D-ready projectors with an available refresh rate of 120 Hz or higher, temporal multiplexing may be imperceptible to the user. The result of the combined outputs from the light modulators 120 and 140 may be an edge-enhanced image $I_v$ of non-uniform pixel density.

To display the edge image $I_v$ at a higher resolution, optical pixel sharing may be employed. In one embodiment, optical pixel sharing may reduce the area of each projected pixel by a factor of $1/c^2$ while increasing their density by $c^2$ at the edges. Considering that many images may have few edge features compared to non-edge features, an optical pixel sharing unit, for example, the optical element 130 (FIG. 1) may use edge regions for display at higher resolution that would minimize visible artifacts while passing non-edge regions through with the need to modify pixels capturing the non-edge regions.

In some projectors, white light from a light source may illuminate a light modulator panel that spatially modulates the light to produce different pixels. A light modulator panel (either a transmissive LCD or a reflective DMD) may be a 2 dimensional array of modulation elements or pixels, where each element can block or attenuate the light to achieve a brightness between 0 (black) and 1 (white). Under a linear transfer function, the relationship between the input and the modulated output is linear. For single chip projectors, three channels of colors may be produced by temporally multiplexing R, G and B filters placed in front of the lamp. For three-chip projectors, multiple optical paths are used for the three channels that are then combined to create the final image. According to exemplary embodiments of the subject technology, some embodiments may be described as a grayscale or single channel digital projector. Further embodiments may also be described as including multiple channels multiple channels.

Figure 3:
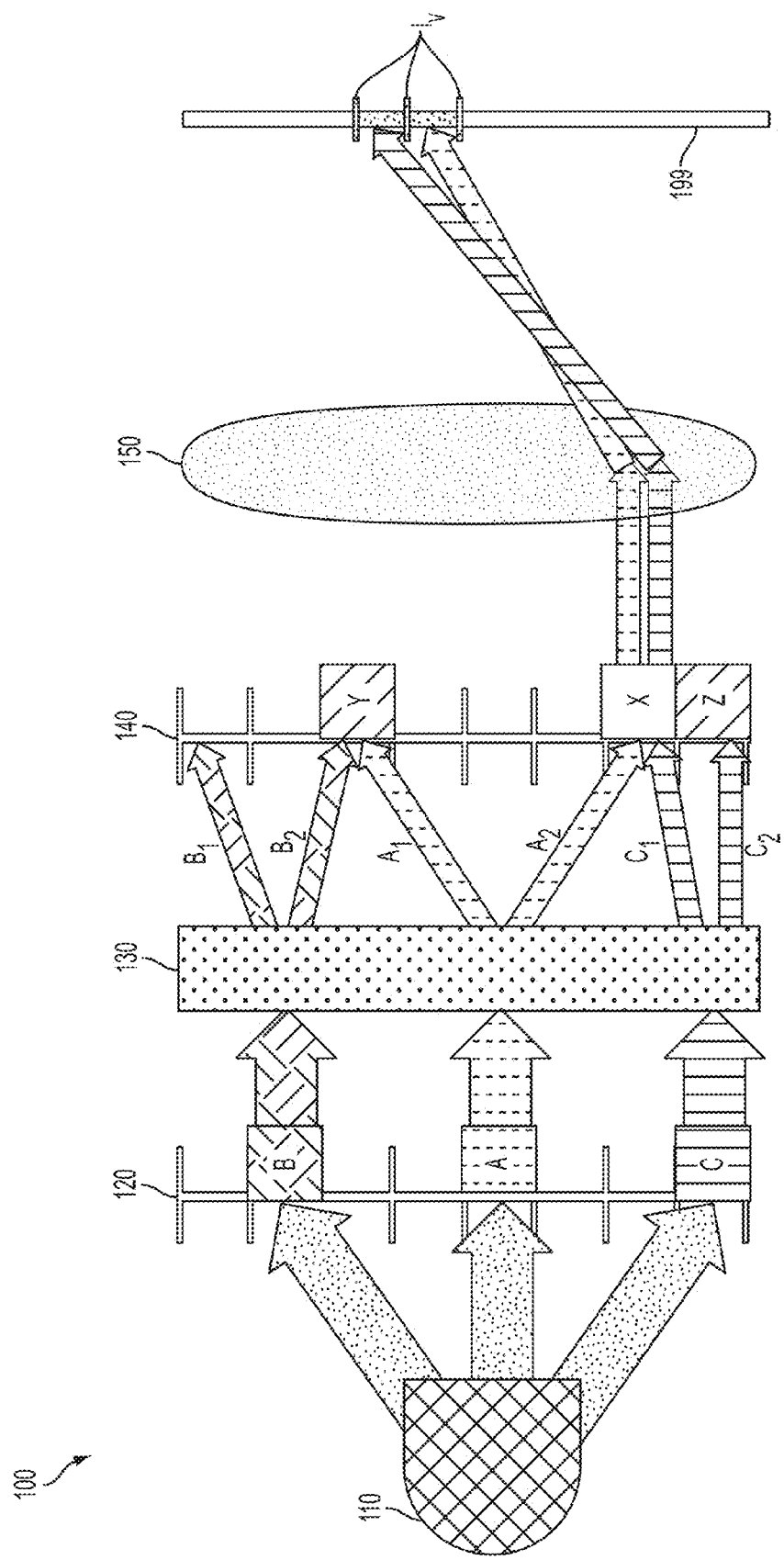
FIG. 3 is a side view of a block diagram of the projector of FIG. 1 showing how some pixels are produced at high resolution in the high-resolution image passed through light modulators.

Referring now to FIG. 3, the projector 100 is shown illustrating exemplary optical paths and pixel display control for producing the image $I_v$ onto a screen 199. In an exemplary embodiment, two cascaded and aligned low-resolution (n×n) light modulators 120 and 140 are arranged with the optical element 130 with the in between them. The light modulators may also be referred to as light modulator panels for some embodiments. In some embodiments, the optical element 130 may be a pixel sharing unit and the remaining description may refer to the optical element 130 interchangeably as the optical pixel sharing unit 130.

The optical pixel sharing unit 130 may be configured to divide the input light to create $c^2$ copies of every pixel of the first light modulator panel 120, where each copy may be downsized by a factor of c in each direction. For example, each pixel (as shown for sake of illustration by only three blocks "A", "B", and "C" representing a single pixel each, however it will be understood that more pixels may be generated) in the first light modulator panel 120 may pass through the optical pixel sharing unit 130 which may create $c^2$ smaller spatially non-adjacent copies of each pixel (represented as rays "$A_1$", "$A_2$", "$B_1$", "$B_2$", "$C_1$", and "$C_2$") from the light modulator panel 120.

The optical pixel sharing unit 130 may also jumble the placement of these smaller pixels at non-adjacent locations on the second light modulator panel 140. Thus, a total of $c^2n^2$ smaller pixels may be focused onto the second light modulator panel 140. In some embodiments, $c^2$ sized smaller pixels (smaller than pixels generated at light modulator panel 120) may also thus be focused at each pixel of light modulator panel 140. The copies of pixels may be created with the same content as the pixels generated by light modulator 120 while each pixel in the second light modulator panel 140 may attenuate $c^2$ spatially adjacent smaller pixels of different content. For example, the controller 160 may be configured to control light modulator panel 140 to selectively reproduce which copies of pixels will be displayed from the light modulator 140. In some cases, only a single copy of a pixel may be incident in a region of the light modulator panel 140. For example, the region "Z" may control copy $C_1$. The light modulator panel 140 may be configured to determine if the copy of a pixel should be displayed or filtered out for a given image, for example $I_e$ or $I_{ne}$. In some cases, more than one copy of pixels of a different origin from the light modulator 120 may be incident on the same region of the light modulator 140 producing a potential conflict for which piece of data should be shown. The light modulator 140 may be controlled to predetermine which copies of pixels from the light modulator 120 activate a location on the second light modulator 140 and are eligible to display. For example, the region "X" on the second light modulator panel 140 controls copies $A_2$ and $C_1$ as shown. The region "Y" may control copies $A_1$ and $B_2$. In an exemplary embodiment, "X" and "Y" may be in conflict due to "A" while "X" and "Z" may be in conflict due to "C". Thus, "Y" and "Z" may be blocked (indicated by black) because X is passed (indicated by white) by the second light modulator 140.

In an exemplary embodiment, the displayed image $I_v$ may be displayed according to the following. The lower resolution non-edge image, $I_{ne}$ by turning the first light modulator panel 120 completely ON and passes the light from the light source 110 without any modulation. In this situation, the optical pixel sharing unit 130 may not have any effect and the image $I_{ne}$ may be used as input to the second light modulator panel 140 to create for example, non-edge pixels at a first or lower resolution. To display the higher resolution image $I_e$, first the locations on the second modulator panel which needs to be displayed at a higher resolution are decided. Appropriate pixels in the first modulator panel which provides smaller copies at these pixels in the second light modulator panel 140 may be turned ON with the desired input. If two pixels in the second light modulator panel 140 that need to be at a higher resolution get their input from the same pixel of the first light modulator panel 120, one of the pixels (depending on the importance of their being in higher resolution) will be turned OFF to avoid a conflict. All the pixels turned ON in the second light modulator panel 140 during display of the non-edge image $I_{ne}$ may be turned OFF in this frame.

For each edge pixel of the second light modulator panel 140, the first light modulator panel 120 and the optical pixel sharing unit 130 together may create $c^2$ adjacent smaller pixels. However, these smaller pixels may receive their input from $c^2$ different pixels in the first light modulator panel 120. For example, a function may be represented by letting a pixel (i; j) in the first modulator panel 120 be routed to a smaller pixel (s; t) in the second modulator panel 140. Then a jumbling function F may be defined as $F(s; t)=(i; j)$ (for e.g. $F(A_2)=A$ and $F(C_1)=C$). Note that F may depend on how the hardware for optical pixel sharing is designed and not on the image content. Also, due to the jumbling, adjacent pixels in the first light modulator panel 120 may create non-adjacent pixels in the displayed image $I_v$.

To display a pixel in the second modulator panel 140 at high resolution, for example, a pixel in region "X"), the corresponding $c^2$ smaller pixels in the second modulator panel 140, for example, pixel copies $A_1$ and $A_2$ may be considered. For each of these pixel copies, a value of I(s; t) may be input at the location F(s; t) in the first light modulator panel 120, for example pixels A and C. The input image to the first and second modulators 120, 140 may generate $I_e$ and $I_{ne}$ respectively by using a jumbling function $F(s; t)=(s \mod n; t \mod n)$. This jumbling function creates c smaller copies of each pixel at a distance of 1/c in each of the horizontal and vertical directions. Essentially, this may be similar to creating a grid of c×c smaller images.

The jumbling function F may be a many-to-one function. A lower resolution pixel (i; j) in the first modulator panel 120 may feed many higher resolution pixels (s; t) in the displayed image I. For example, pixel A may feed or create to smaller pixels—one at region "Y" via copy $A_1$ and another at region "X" via copy $A_2$. In an exemplary embodiment, only one input may be given to represent the pixel A. The second light modulator 140 may either take the value of the smaller pixel at region "X" or that at region "Y". In some embodiments, only one of the image at "X" or at "Y" may be displayed at higher resolution in the final image $I_v$, and the other may be blocked; for example copy $A_2$ is passed while $A_1$ is blocked. Thus, in some embodiments only one of "X" or "Y" can be at high-resolution at a time. This blocking of one pixel image at the second light modulator 140 may be considered a conflict. For example, regions "X" and "Y" may be in conflict due to copies of pixel A at regions "X" and "Z" are in conflict due to copies of pixel C also being at region "Z". Consequently, considering conflicts among all the pixels, in some embodiments only a subset of edge pixels EM→E may be displayed at a higher resolution. However, it may be appreciated that due to the sparsity of the edge pixels in many target images the subset of edge pixels for the image $I_e$ may be small compared to the remaining low resolution pixels for the image $I_{ne}$.

Figure 4:
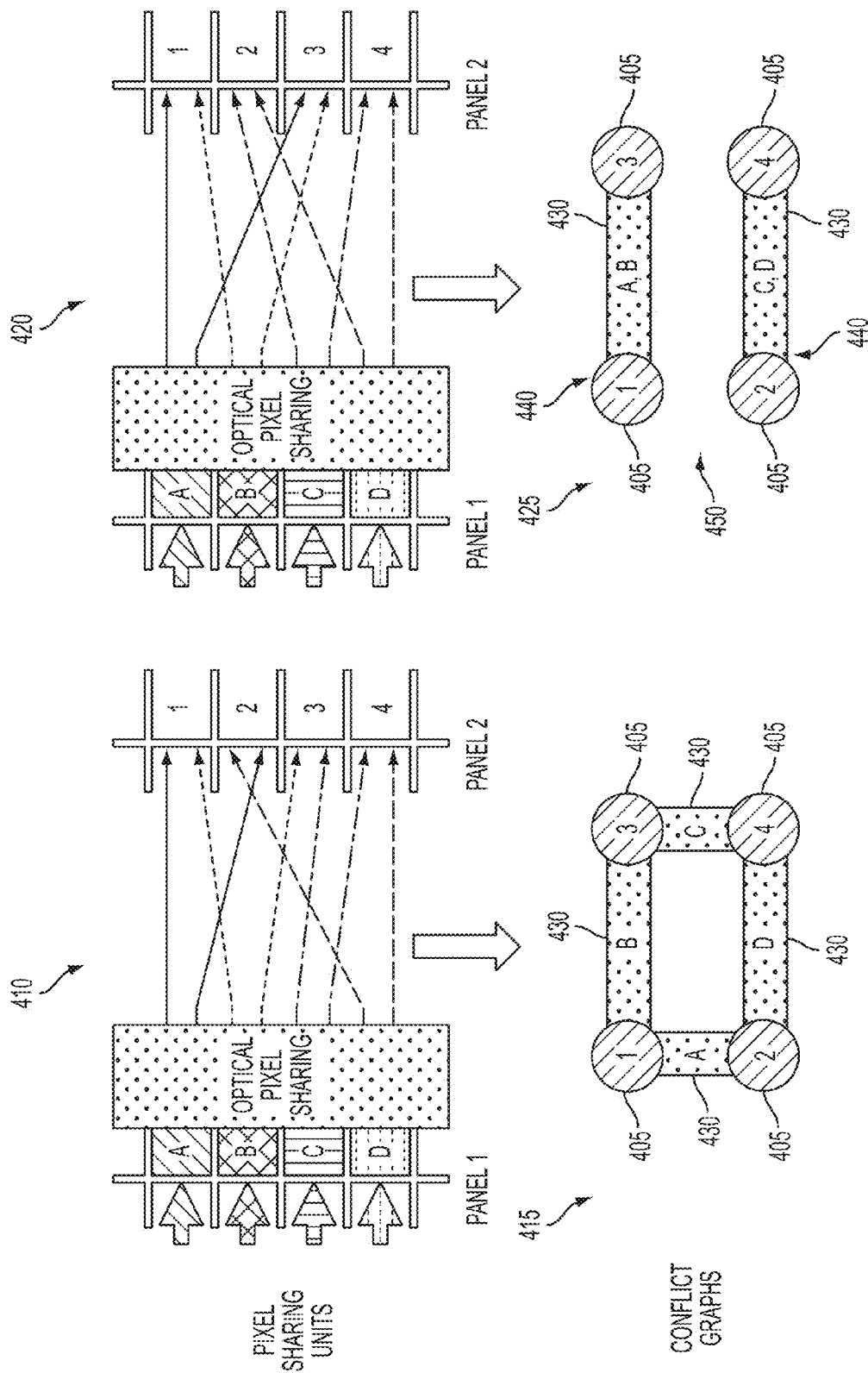
FIG. 4 is a diagrammatic view of pixel sharing configurations and resulting conflict graphs in accordance with another exemplary embodiment of the present invention.

Referring now to FIG. 4 two maps (410 and 420) representing the results of different jumbling functions for controlling the image output from the optical pixel sharing unit 130 onto the light modulator 140 and their corresponding conflict graphs 415 and 425 are shown. Each node 405 may denote a low resolution pixel in the second light modulator panel 140. An edge 430 between two nodes 405 may denote a conflict. The edge 430 is labeled with the pixel ("A", "B", "C", "D") in the first light modulator 120 due to which conflict occurs. For the jumbling function represented by the graph 410, every pixel is in conflict with another. Hence, only one of the four pixels can be ON when displaying the edge image $I_e$. The jumbling function represented by the graph 425 may be a result of embodiments of the present invention. The graph 425 shows a set 450 of cliques 440 and hence two of the four pixels can be ON when displaying the edge image $I_e$.

In an exemplary embodiment of an edge-enhanced image $I_v$, the jumbling function F may be implemented by a grid of c×c lenses. A c×c grid of lenses, each lens of focal length f, if placed at distance $d=f(1+c)$ from the first light modulator panel 120, may create $c^2$ copies of the image of this panel focused on the second light modulator panel 140, each scaled by a factor of 1/c in each direction. The $c^2$ copies of the first light modulator panel 120 may be placed contiguously without any gap or overlap. If a pixel at vertical distances y and r+y from the optical axis of top and bottom lenses respectively (of an optical pixel sharing unit 130 with two or more lenses) and the distance between the optical axes of the two vertically adjacent lenses is r, then two copies of this pixel will be at distance y/c and r+y/c from the optical axis of the top and bottom lenses respectively. Therefore, considering the distance r between the two axes, the distance between these two copies is given by r+(r/c). Assuming a to be the height of the light modulator panels 120 and 140, this distance should be same as a/c. Therefore, r=a/(1+c). Similarly, the horizontal distance may be found between the optical axes of the lenses. Note that f can be chosen arbitrarily but, in some embodiments should be positive to focus the image of the first light modulator panel 120 onto the second light modulator panel 140. It can be shown theoretically that the particular F achieved by a grid of lenses according to exemplary embodiments of the present invention may minimize the number of conflicts, may maximize the number of edge pixels that can be displayed at a higher resolution, and may simplify resolving conflict by selecting an edge pixel that has the highest difference from a threshold from amongst conflicting pixels.

Figure 5:
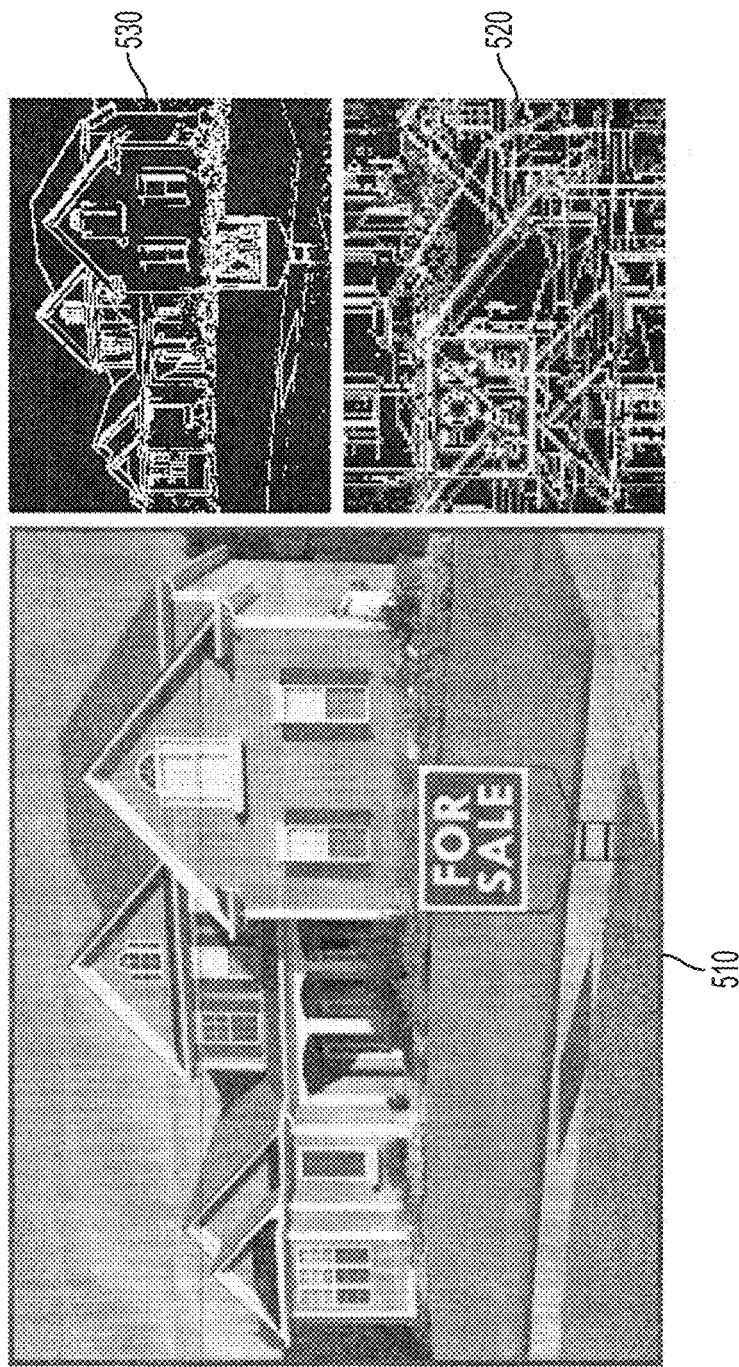
FIG. 5 is an image view of a target image deconstructed into a low resolution non-edge image and a higher resolution edge image in accordance with another exemplary embodiment of the present invention.

Referring now to FIG. 5, an exemplary edge-enhanced image 510 is shown. The image 510 may be produced by combining images 520 and 530. Image 520 may be a high resolution edge image, for example, an edge image $I_e$. The image 530 may be a low resolution non-edge image, for example, the non-edge image $I_{ne}$. The jumbling effects previously described may be seen in the high resolution edge image 520. As may be appreciated, control of the edge pixels according to embodiments of the present invention may yet produce sharp resultant images when complemented with the low resolution non-edge image 530.

Figure 6:
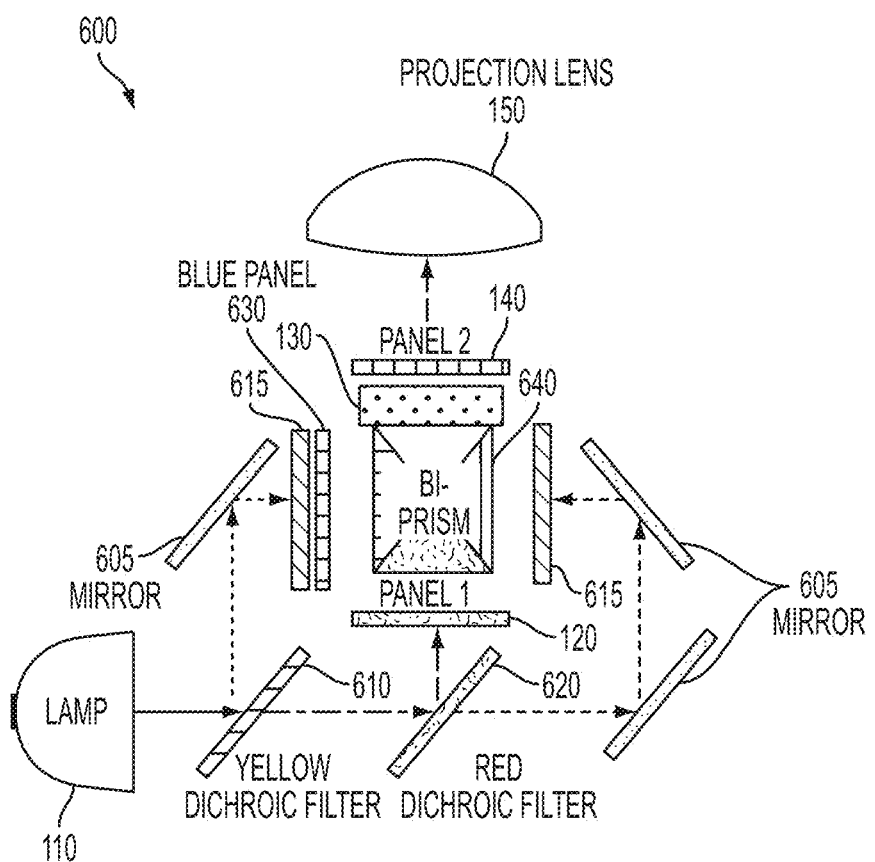
FIG. 6 is a diagrammatic view of a projector architecture employing a 3 chip design in accordance with yet another exemplary embodiment of the present invention.

Referring now to FIG. 6, embodiments of the present invention may be applied to three channels. Delta E thresholding for RGB color may be employed to generate $I_e$ and $I_{ne}$. However, the optical design can be extended in two different ways depending on the existing projector design architecture. For a single chip architecture (not shown), a color wheel may be introduced right before the first light modulator panel 120. For a 3-chip projector architecture 600, mirrors 605 and dichroic filters (610 and 620) may be used to divide white light from light source 110 into red, green and blue outputs which follow three different optical paths. For sake of illustration a monochromatic output design is shown where two of the three colors may be blocked from transmission by baffles 615 intercepting their filtered components. However, it will be understood that the different color images may be used simultaneously. To produce a final output image comprising two or more colors, a bi-prism 640 may be disposed between the light modulator 120 and the optical pixel sharing unit 130 as described in the following.

In an exemplary embodiment, the projector architecture 600 is shown for a green image output. The first light modulator panel 120 may be disposed in the path of the desired color output, for example green light. The green light may be a result of yellow light being passed through the yellow dichroic filter 610 whose green component is then reflected from a red dichroic filter 620.

The first light modulator 120 may be controlled to provide a low resolution output of the green image. The low resolution green image may be transmitted into the bi-prism 640, where for example red and blue image outputs may be re-combined with the green image into a polychromatic image. The low resolution image from the bi-prism may be transmitted through the optical pixel sharing unit 130 where smaller copies of pixels from the low resolution image are transmitted to the second light modulator 140. As described previously, an edge image Ie may be produced by selectively controlling which smaller copies of pixels are produced in the second light modulator 140. Temporal modulation may be employed to produce the edge-enhanced image Iv, which in this case is a green image. While the foregoing embodiment was described in the context of producing a green edge-enhanced image Iv it may be seen that a polychromatic edge-enhanced image Iv may be produced by positioning multiple light modulators 120, 630 in respective filtered color paths (R, G, B) before the bi-prism 640.

Due to conflicts within a pixel region, two adjacent edge pixels might be displayed in two different resolutions. The difference in resolution may be perceptible, creating a visual artifact. In order to alleviate the perception of a visual artifact, a smoothing processing may be employed. The smoothing process may be adjusted for different applications for example, face sensitive displays or visualization sensitive display.

In an exemplary embodiment of a smoothing process according to the present invention, for every pixel (i; j)∈E, a binary weight W(i; j) may be assigned. A weight of 1 may indicate that a pixel will be displayed at high resolution and a weight of 0 may indicate that the pixel will be displayed at low resolution due to a conflict. For example, ∀(i; j)∈EM,W(i; j)=1 and ∀(i;j)∈E−$E_M$,W(i;j)=0. ∀(i;j)∈$\bar{E}$, W(i;j) may not be relevant in some cases and hence may be initialized to an irrelevant term. The smoothing process may smooth the discontinuities in the relevant portions of W to create a non-binary W', 0≤W' (i; j)≤1. W'(i; j) may provide a weight for combining the high and low resolution content at pixel (i; j) to avoid visual artifacts 735. Hence, to create the final edge enhanced image 750, the contribution from the higher resolution $I_e$ may be weighted by W'(i; j) and get the rest of the contribution from (1−W'(i; j))$I_L$ where $I_L$ may represent the low resolution image (for example, $I_{ne}$). Note that for (i; j) where W(i; j)=0, W'(i; j) may be kept at 0 since these pixels may not be reproduced any better than the low resolution. In addition, for pixels where W(i; j)=1, their weight may be reduced minimally so that high resolution content may be retained maximally.

Figure 7:
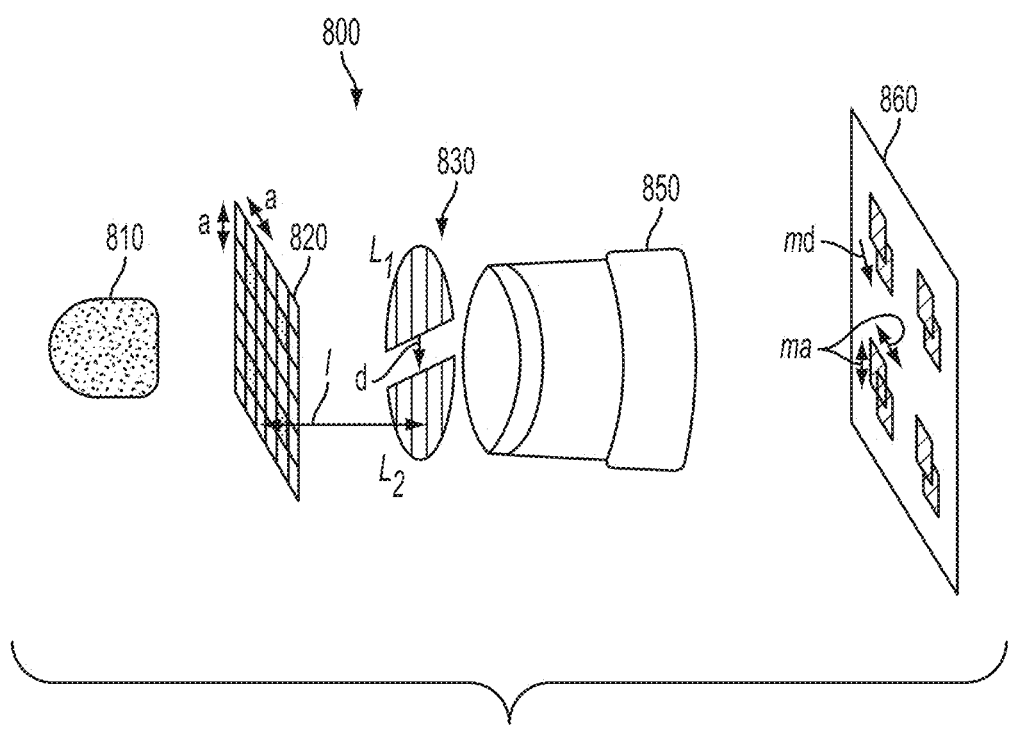
FIG. 7 is a perspective view of a projector design in accordance with still yet another exemplary embodiment of the present invention.

Referring now to FIG. 7, a projector 800 is shown according to yet another exemplary embodiment of the present invention. The projector 800 may also introduce an optical element 830 between a light modulator 820 and an imaging lens 850. For example, the projector 800 may include a light source 810, the light modulator 820 in an optical path with the light source 810, the imaging lens 850 in the optical path with the light source 810 and the light modulator 820, and the optical element 830 disposed in the optical path between the light modulator 820 and the imaging lens 850. For sake of illustration, a controller (not shown) similar to controller 160 (FIG. 1) is omitted from view. However, it will be understood that the controller may be connected to the light modulator 820 similar to how the controller 160 may be connected to the light modulator 120. In an exemplary embodiment, the light modulator 820 may be a panel, for example an LCD or reflective DMD. In an exemplary embodiment, the optical element 830 may be configured for pixel sharing. In some embodiments, the optical element 830 may be a pair of shifting lenses.

The two lenses (L1 and L2) of optical element 830 may have the same focal length, f, on the light path between the light modulator 820 and the imaging lens 850. If these lenses are placed at distance 1 from the light modulator 820 on a plane perpendicular to the optical axis of the imaging lens 850, the lenses may have the same magnification factor of m=f/(1−f). The light from each pixel produced by light modulator 820 passes through both lenses creating two copies of each pixel. Consequently, the shift between the two copies may depend on the distance between the optical axes of the two lenses. This shift may be indicated by vector $d=(d_x;d_y)$ where the coordinate system is aligned with the pixel grid of the light modulator panel 820. If a pixel of the light modulator 820 is at an arbitrary distance d' from the optical axis of L, it may be located at distance d+d' from the optical axis of L2. Therefore, the two shifted copies of this pixel may be formed at distances md' and md+md' from the optical axes of L1 and L2 respectively. Since the distance between the optical axes of L1 and L2 is d, the distance between the two shifted copies will be d+md. If the size of the pixel is a units in each dimension then after magnification the size of the pixel is ma units. Consequently, the shift between the two copies is $(s_x; s_y)=((1+m)d)/ma=(1+(f/l-f))d/(f/(l-f))a=(l/l-f)d/(f/l-f))a=/d/fa$.

Figure 8:
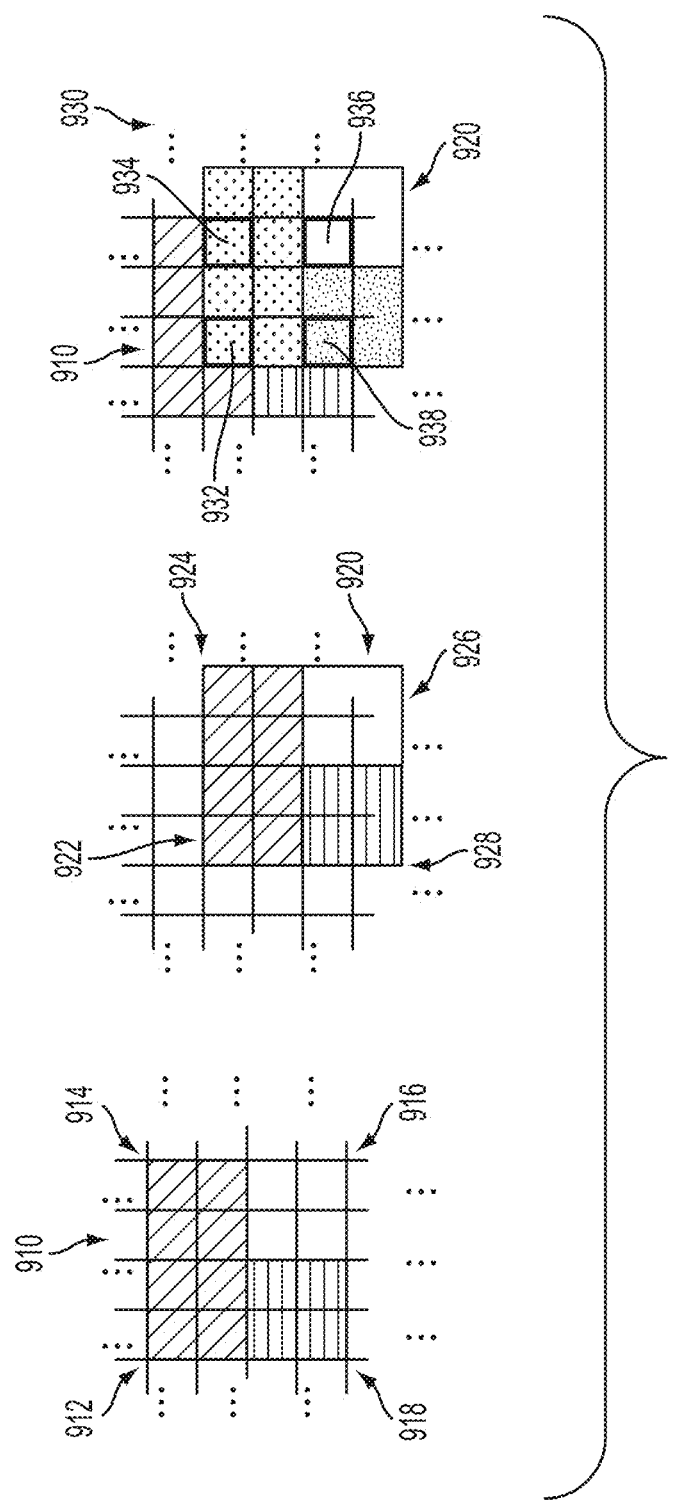
FIG. 8 is a series of pixel charts showing shift and overlap of a pixel in accordance with still yet another exemplary embodiment of the present invention.

Referring now to FIG. 8 concurrently with FIG. 7, pixel sharing according to another exemplary embodiment of the present invention is shown. The pixel sharing shown in FIG. 8 may be provided for example, by employing the shifting lenses of projector 800. In the exemplary embodiment shown, smaller copies of pixels from the light modulator 820 may be reproduced by overlaying a pixel with a shifted copy of itself. Shifting a pixel and overlaying it with itself may sometimes achieve a non-square, sometimes non-rectangular shape of a pixel. Further, it may create a pixel which can overlap with its adjacent pixels. The set of shifting lenses (optical element 830) may create multiple shifted and overlaid copies of the pixels without modifying their sizes. Since a reduction in pixel size may not be provided a high frequency boost filter may be employed during image reconstruction leading to lesser attenuation of higher frequencies and hence a more pleasing appearance. However, the pixel shapes resulting from a shift and overlay approach may allow a more accurate representation of certain directional image features. The reshaped pixel shape has a larger frequency bandwidth in a certain direction and may thus favor certain gradient directions more than the others. For example, gradients along the direction of the shift may be represented without any artifacts while gradients in the perpendicular direction may continue to have jaggy artifacts as in a lower resolution image, thus, increased resolution may be achieved by varying the spatially density of pixels in a directional gradient.

A low resolution image (I) 910 with larger pixels, may be twice the size of pixels in $I_r$ in each direction. Four different pixels (912; 914; 916; 918) are shown as four different colors represented in varying shades of grayscale. The same image (I) may be shifted by $s_x=s_y=0.5$ pixel units. The resulting image may be labeled as shifted image copy 920. The shifted image copy 920 may include pixels (922; 924; 926; 928) corresponding to copies of pixels (912; 914; 916; 918). The low resolution image (I) 910 and its shifted image copy 920 may overlaid on each other creating an overlaid image $(I_r)$ 930. The pixels with dark black boundaries get contributions from the same pixel in low resolution image (I) 910 and shifted image copy 920 while the other pixels get contributions from different pixels of low resolution image (I) 910. The result of the overlaying may be a set of higher resolution fractional pixels (932; 934; 936; 938). The higher resolution fractional pixels (932; 934; 936; 938) may be modulated so that their projection through imaging lens 850 may produce an image with regionalized enhanced resolution on screen 860. As shown on screen 860, the direction of overlay shifting may be performed for example along vertical, horizontal, or diagonal gradients. Moreover, it may be appreciated that by employing fractional pixels to provide higher resolution imaging, higher resolution of various shapes, for example non-rectangular pixel copies may be achieved. By controlling the placement of pixel overlay, curvilinear elements may be enhanced in the resultant image.

Figure 9:
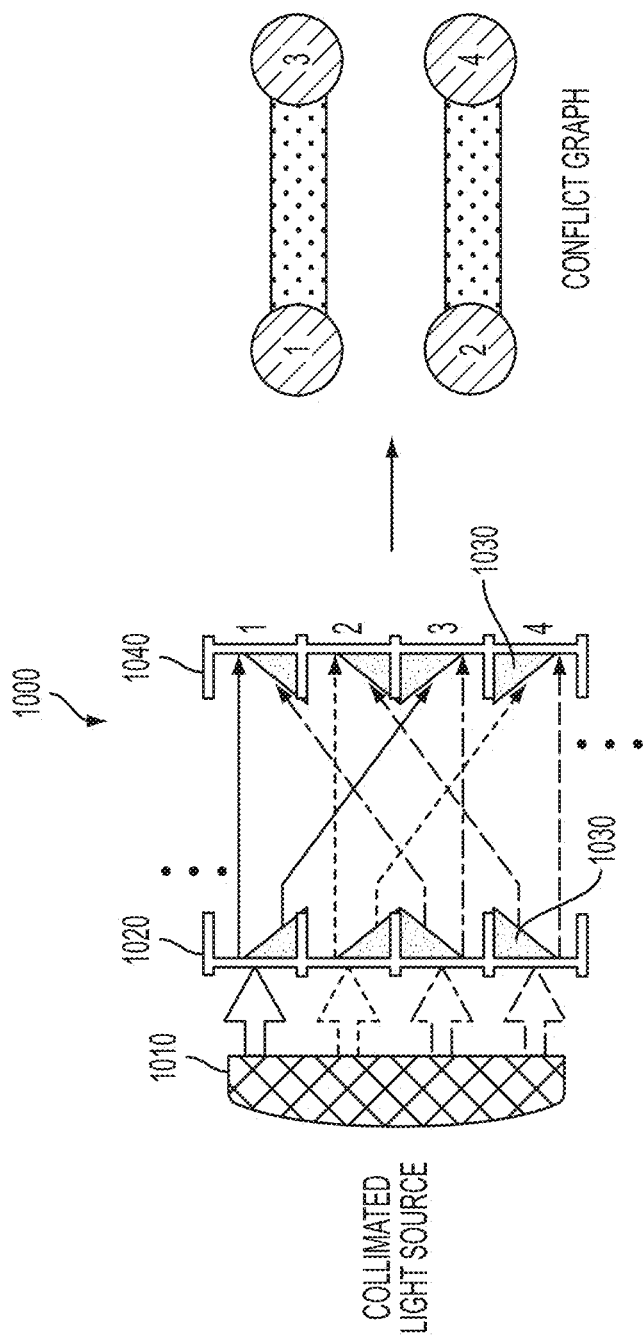
FIGS. 9A and 9B are a projector design and an associated conflict graph of pixels generated in accordance with still yet another exemplary embodiment of the present invention.

Referring now to FIGS. 9A and 9B, a projector design 1000 according to another exemplary embodiment of the present invention is shown. The projector design 1000 may be similar to the projector 100 where a light source 1010, a first light modulator 1020, an optical element 1030, and a second light modulator 1040 may be employed. For sake of illustration, the controller and imaging lens are not shown however are understood as being available as described above. In an exemplary embodiment of the projector design 1000, the light source 1010 may be collimated. As an example of the various optical elements 1030 that may be employed, a set of prisms (also referred to as prisms 1030) may be positioned on the light modulators 1020 and 1040. The prisms 1030 may be positioned on various regions of the light modulators 1020 and 1040 where pixel sharing may be desired. Pixel copies generated by light modulator 1020 may be produced by arranging the prisms 1030 on light modulator 1020 to refract the pixels onto predetermined regions of the light modulator 1040. For sake of illustration, only four pixel regions ("1", "2", "3", "4") are shown on light modulator 1040 but it will be understood that more or less regions may be employed. As described in previous embodiments, selected regions of a target image may be passed from the light modulator 1020 to the light modulator 1040. As described previously, some of the pixel regions ("1", "2", "3", "4") may have conflicts. The determination of which pixel region ("1", "2", "3", "4") and its associated pixel images received from light modulator 1020 that are shown may be controlled so that selected regions of the final output image are shown with enhanced resolution. Referring in particular to FIG. 9B, the arrangement of prisms may be performed so that optimal passage of pixels with minimal conflicts may be achieved. For example, as shown, the projector design 1000 may produce conflicts between images produced at regions "1" and "3" and between images produced at regions "2" and "4". Thus two of the four pixels can be ON when displaying the resulting image.

Figure 10:
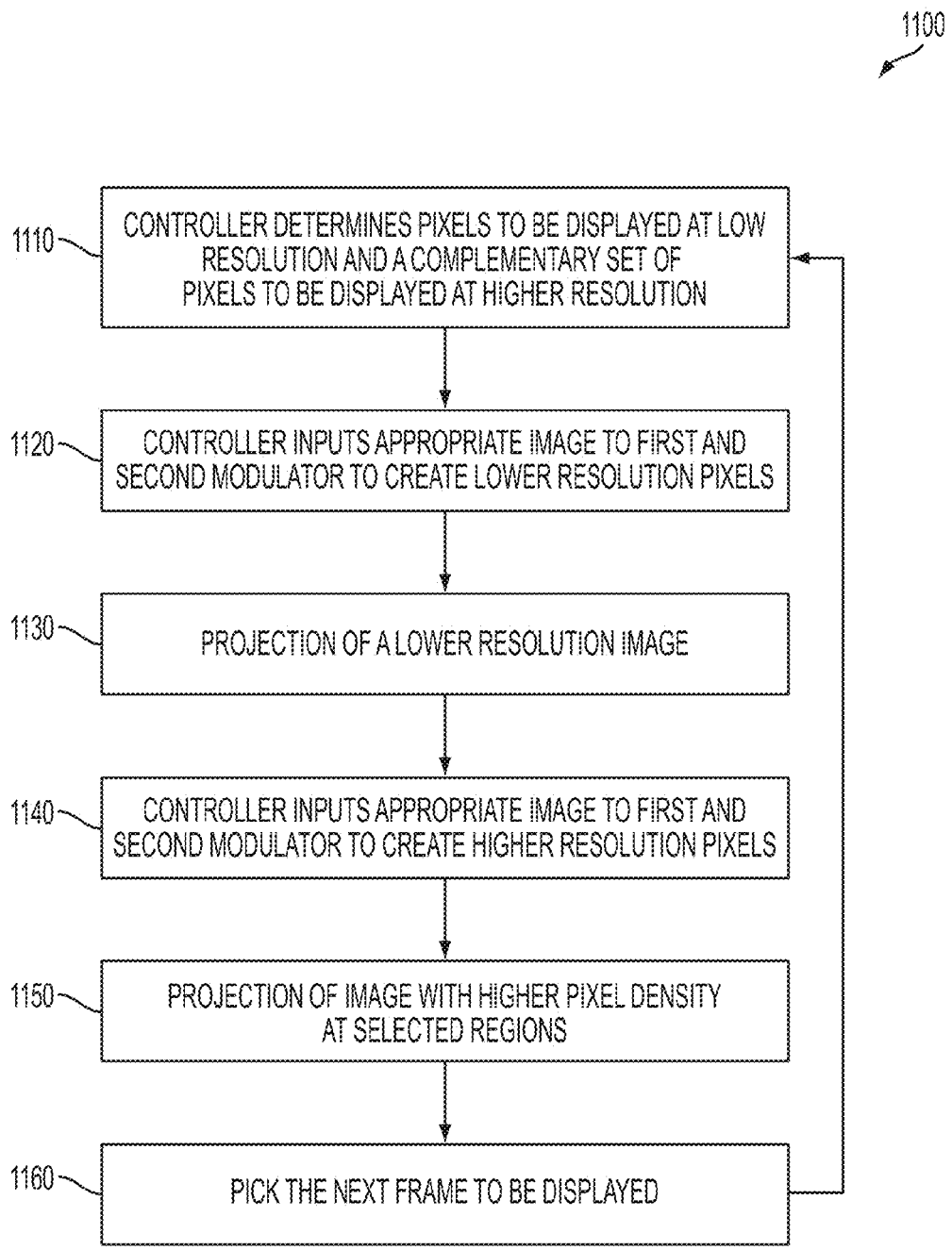
FIG. 10 is a flowchart of a method of producing an image in accordance with still yet another exemplary embodiment of the present invention.

Referring now to FIG. 10, a method 1100 of producing an image is shown according to an exemplary embodiment of the present invention. The controller may determine (1110) which pixels may be displayed at low resolution and a complementary set of pixels to be displayed at higher resolution. The controller may input (1120) an appropriate image to first and second modulator to create the lower resolution pixels. The controller may project (1130) the lower resolution image. The controller may input (1140) an appropriate image to first and second modulator to create an image with the higher resolution pixels. The controller may project (1150) an image with higher pixel density at selected regions. A next frame may be chosen (1160) to be displayed.

It should be understood, of course, that the foregoing relates to exemplary embodiments of the invention and that modifications may be made without departing from the spirit and scope of the invention as set forth in the following claims. For example, while the foregoing was described primarily in the context of a projector, it will be understood that other optical devices may be employed using the aforementioned embodiments described. For example, a camera may be configured to introduce an optical element between a modulator and an imaging lens which may produce increased resolution of a target image within selected regions of the reproduced image.

What is claimed is:

1. An apparatus, comprising:
a first light modulator in an optical path with a light source;
an imaging lens in the optical path with the light source and the first light modulator;
an optical element disposed in the optical path between the first light modulator and the imaging lens;
a second light modulator, wherein the optical element is disposed between the first light modulator and the second light modulator; and
a controller, electrically connected to the first light modulator, to turn on and off pixels of the first light modulator to vary a spatial light pattern of a spectrum of light emitted from the light source to produce a display having a first resolution in areas of the display having a first frequency content and having a second resolution in areas of the display having a second frequency content, wherein the first resolution is higher than the second resolution, and wherein the first frequency content is higher than the second frequency content.

2. The apparatus of claim 1, wherein:
the controller is configured to produce a light output of pixels from the first light modulator;
the optical element is configured to divide the light output of pixels into smaller copies of the pixels projected at non-adjacent locations; and
the controller is configured to selectively reproduce the smaller copies of the pixels onto the imaging lens.

3. The apparatus of claim 2, wherein the controller is configured to produce a temporally multiplexed output image comprising alternating between a first output image of uniform pixel density and a second output image with selected regions of higher pixel density.

4. The apparatus of claim 1, wherein the optical element is configured to transmit copies of two or more pixels from the first light modulator sharing a common pixel region, wherein the two or more copies of pixels from the first light modulator are of a first pixel size and the common pixel region is smaller than the first pixel size.

5. The apparatus of claim 1, wherein the optical element is configured to produce, at a predetermined focal length, smaller copies of pixels produced by the first light modulator.

6. The apparatus of claim 5, wherein the smaller copies of pixels are of selected regions of pixels on the first light modulator.

7. The apparatus of claim 2, wherein the controller is configured to control the first light modulator and second light modulator to produce an image output of pixels of non-uniform pixel density.

8. The apparatus of claim 1, wherein the optical element is configured to produce a first copy of a pixel from the first light modulator, overlaying at least partially, a second copy of a pixel from the first light modulator.

9. The apparatus of claim 1, wherein the optical element includes a pair of lenses configured to produce a first copy of a pixel and a second copy of a pixel, shifted spatially over a portion of the first copy of the pixel.

10. A projector, comprising:
a light source;
a first light modulator in an optical path with the light source;
an imaging lens in the optical path with the light source and the first light modulator;
a second light modulator disposed between the first light modulator and the imaging lens;
an optical element disposed in the optical path between the first light modulator and the second light modulator; and
a controller, electrically connected to the first light modulator and second light modulator, to turn on and off pixels of the first light modulator and the second light modulator to display a projected image, of a target image, produced by temporally multiplexing between a first light output and a second light output, wherein the projected image includes a first region having a first spatial pixel density and a second region having a second spatial pixel density, wherein the first spatial pixel density includes a higher number of image feature edges compared to the second spatial pixel density to produce a display having a first resolution in areas of the display having a first frequency content and having a second resolution in areas of the display having a second frequency content, wherein the first resolution is higher than the second resolution, and wherein the first frequency content is higher than the second frequency content.

11. The projector of claim 10, wherein the first light output is of uniform pixel density and the second light output includes selected portions of the target image, the selected portions having a higher pixel density than pixels of the first light output.

12. The projector of claim 11, wherein the selected portions of the target image include edge features of the target image.

13. The projector of claim 10, wherein the controller is configured to increase resolution in an output image by spatially varying pixel density along a directional gradient.

14. The projector of claim 10, wherein the optical element is configured to divide the first light output into smaller copies of pixels projected at non-adjacent locations from the optical element.

15. A method of producing an image, comprising:
controlling a first and second light modulator to create a first light output of at least a first portion of the image;
controlling the first and second light modulator to create a second light output, of at least a second portion of the image, with a higher resolution relative to a lower resolution of the first light output, at selected spatial regions;
and temporally multiplexing the first and second light outputs to produce an output image with spatially varying pixel density, wherein selected regions of the output image are at a higher pixel resolution than other regions of the output image to enhance edges of image features within the output image to produce a display having a first resolution in areas of the display having a first frequency content and having a second resolution in areas of the display having a second frequency content, wherein the first resolution is higher than the second resolution, and wherein the first frequency content is higher than the second frequency content.

16. The method of claim 15, comprising controlling the first light modulator with an appropriate image that when shifted and at least partially overlaid over itself, achieves super-resolution along a directional gradient.

17. The method of claim 15, wherein visual artifacts are smoothed out of the output image.

18. The method of claim 15, wherein the selected regions of the output image are edge features.

19. The method of claim 15, wherein the output image includes pixels of non-rectangular shape.

* * * * *